(12) United States Patent
Tsai

(10) Patent No.: US 6,257,530 B1
(45) Date of Patent: Jul. 10, 2001

(54) CLASPING DEVICE FOR LONGITUDINAL OBJECT

(76) Inventor: Chin Hai Tsai, No. 26, Gong Yuan Road, San Chong City, Taipei (TW), 241

( * ) Notice: Subject to any disclaimer, the term of this patent is extended or adjusted under 35 U.S.C. 154(b) by 0 days.

(21) Appl. No.: 09/467,495

(22) Filed: Dec. 20, 1999

(51) Int. Cl.⁷ ...................................................... F16L 3/08
(52) U.S. Cl. ............................................. 248/74.2; 248/73
(58) Field of Search ............................... 248/74.2, 56, 65, 248/71, 72, 73, 689, 214, 219.3, 229.26, 227.3, 227.4, 231.85, 217.3, 218.4, 68, 49, 230.7, 231.81, 507, 224.7, 225.11, 223.41, 229.1, 229.11, 229.16, 228.2, 227.2, 231.31

(56) References Cited

U.S. PATENT DOCUMENTS

| | | | |
|---|---|---|---|
| 2,166,916 | * | 7/1939 | Lombard ................................. 248/73 |
| 3,003,736 | * | 10/1961 | Hofgesang ....................... 248/229.26 |
| 3,216,685 | * | 11/1965 | Raymond ............................ 248/74.2 |
| 3,275,274 | * | 9/1966 | Hutcheon ........................... 248/309.1 |
| 3,444,596 | * | 5/1969 | Soltysik .................................. 248/73 |
| 3,718,381 | * | 2/1973 | Szanny ................................ 338/22 R |
| 4,094,483 | * | 6/1978 | Busch ..................................... 248/73 |
| 4,153,228 | * | 5/1979 | Delserro et al. ..................... 248/74.3 |
| 4,472,018 | * | 9/1984 | Urani .................................... 439/814 |
| 4,917,340 | * | 4/1990 | Juemann et al. .................... 248/74.2 |
| 5,129,607 | * | 7/1992 | Satoh ..................................... 248/83 |
| 5,461,759 | * | 10/1995 | Knoop ..................................... 24/555 |
| 5,533,696 | * | 7/1996 | Laughlin et al. .................... 248/74.2 |
| 5,921,520 | * | 7/1999 | Wisniewski ........................ 248/316.1 |

* cited by examiner

Primary Examiner—Anita M. King
(74) Attorney, Agent, or Firm—Charles E. Baxley

(57) ABSTRACT

A clasping device for clasping a longitudinal object includes a clasping member having a chamber for receiving the object and having one or more blades extended inward of the chamber of the clasping member for engaging with and for clasping the object in the clasping member when the ends of the clasping member are forced toward each other. The blade includes a cusp and/or a tip for clasping the object in the clasping member. The ends of the clasping member are engaged into a socket orifice of a bracket for forcing the blades to engage with the object.

5 Claims, 7 Drawing Sheets

CLASPING DEVICE FOR LONGITUDINAL OBJECT

BACKGROUND OF THE INVENTION

1. Field of the Invention

The present invention relates to a clasping device, and more particularly to a clasping device

2. Description of the Prior Art

A typical clasping device is shown in FIG. 10 and comprises a circular body 90 having one end leg 91 extended through an opening 92 of another end leg 93 for resiliently clasping one or more longitudinal objects 94. The clasping device may be used for clasping the longitudinal objects of a predetermined or particular size only.

The present invention has arisen to mitigate and/or obviate the afore-described disadvantages of the conventional clasping devices for longitudinal objects.

SUMMARY OF THE INVENTION

The primary objective of the present invention is to provide a clasping device having one or more inwardly extended resilient blades for suitably clasping one or more longitudinal objects.

In accordance with one aspect of the invention, there is provided a clasping device for clasping an object, the clasping device comprising a clasping member including a curved body having a chamber for receiving the object, the curved body including two ends and including at least one blade extended inward of the chamber of the curved body for engaging with and for clasping the object in the curved body, and means for forcing the ends of the curved body toward each other and to clasp the object in the curved body.

The blade includes a cusp and/or a tip extended inward of the chamber of the curved body for engaging with and for clasping the object in the curved body. A pair of hand grips are extended outward from the ends of the curved body respectively for forcing the ends of the curved body toward each other and to clasp the object in the curved body. A bracket has at least one socket orifice formed therein for receiving the ends of the curved body.

The ends of the curved body each includes a latch engaged with the bracket for securing the curved body to the bracket. The bracket includes an opening formed therein for receiving a supporting member. A securing device is further provided for securing the bracket onto the supporting member.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
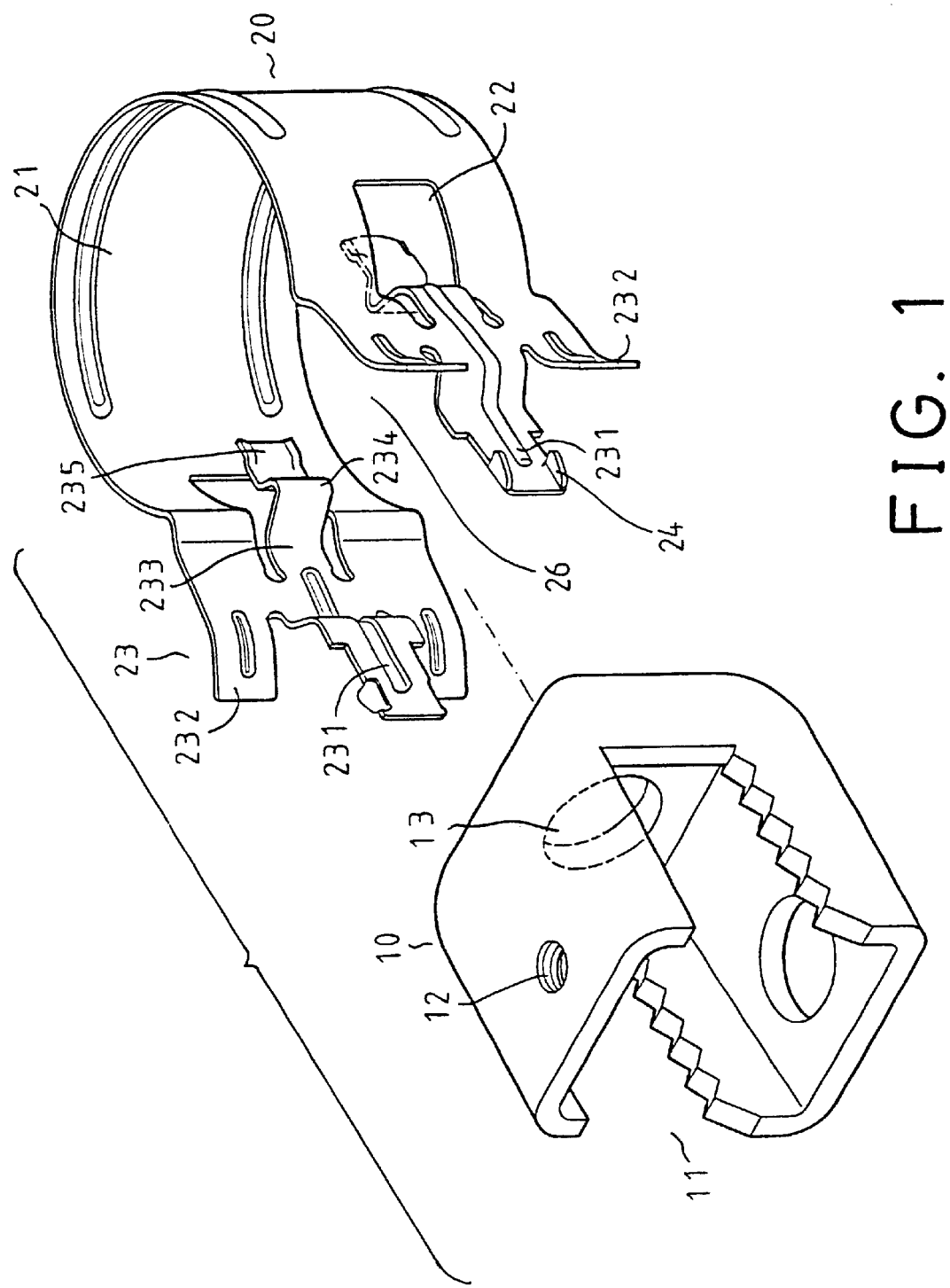
FIG. 1 is an exploded view of a clasping device in accordance with the present invention.
Figure 3:
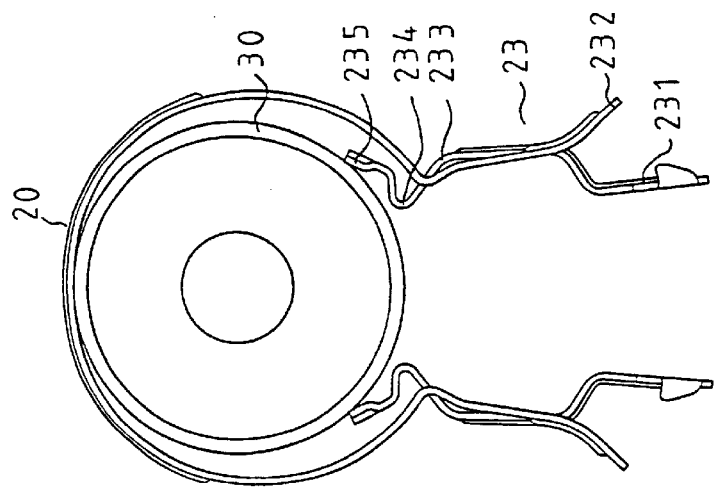
FIGS. 3, 4, 5 are end schematic views illustrating the operation of the clasping device onto the object.
Figure 2:
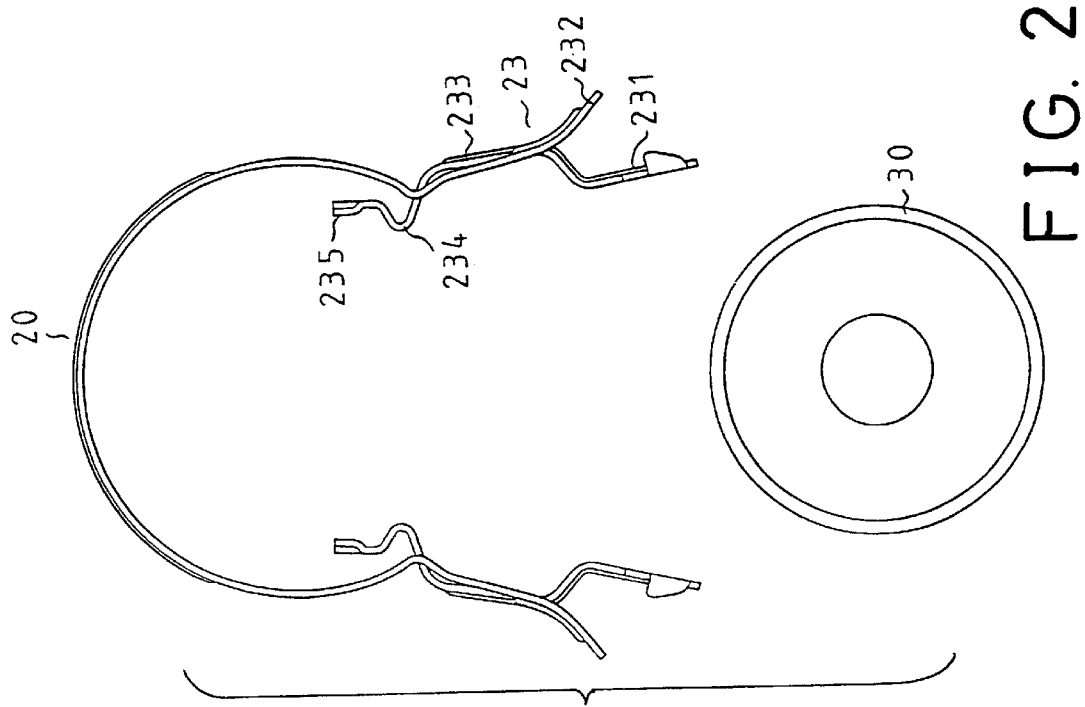
FIG. 2 is an exploded end view showing the clasping device and an object to be clasped by the clasping device.
Figure 5:
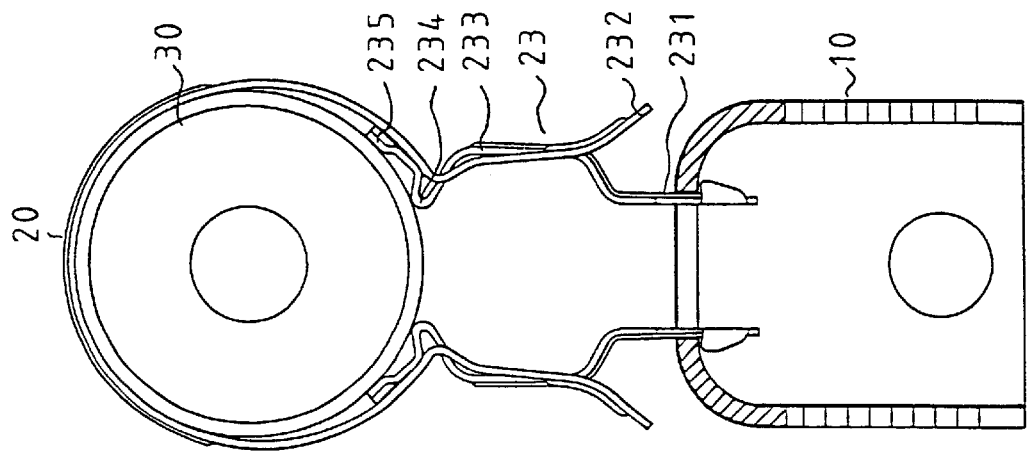
Figure 4:
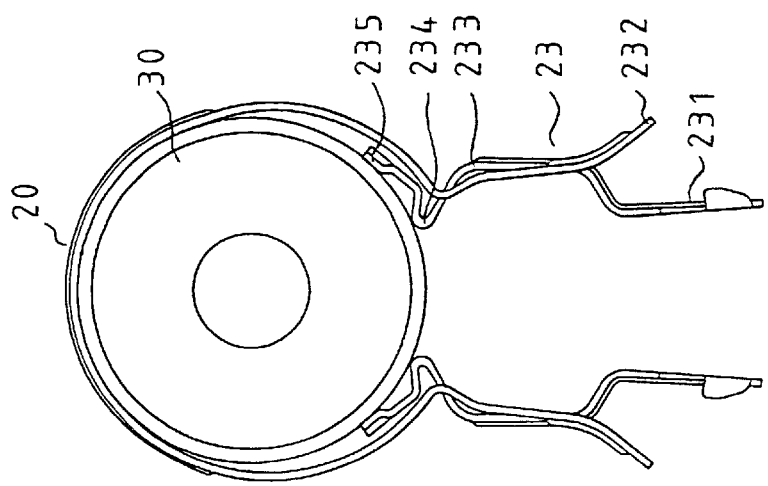
Figure 6:
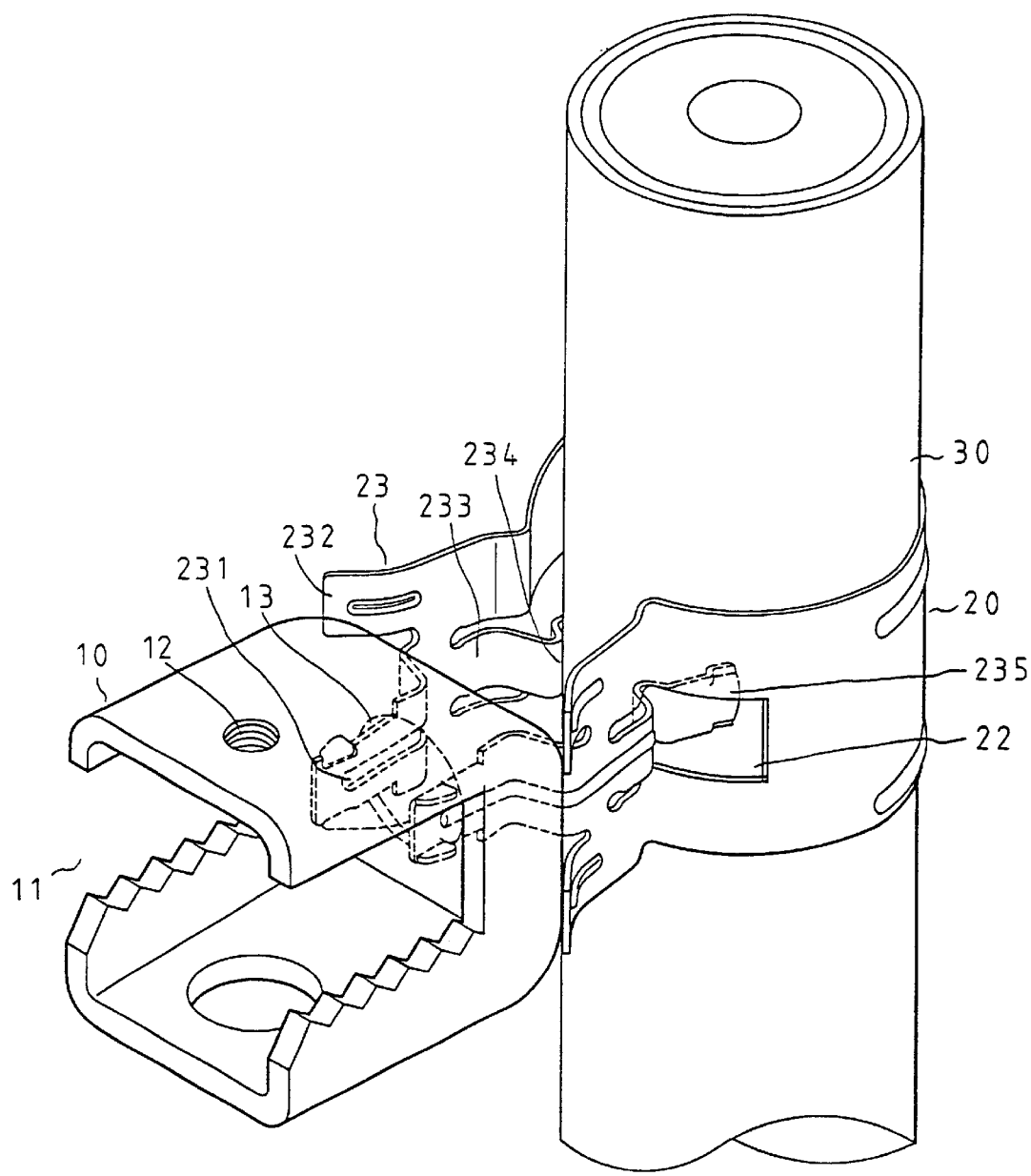
FIGS. 6, 7, 8 are perspective views illustrating the operation of the clasping device.
Figure 7:
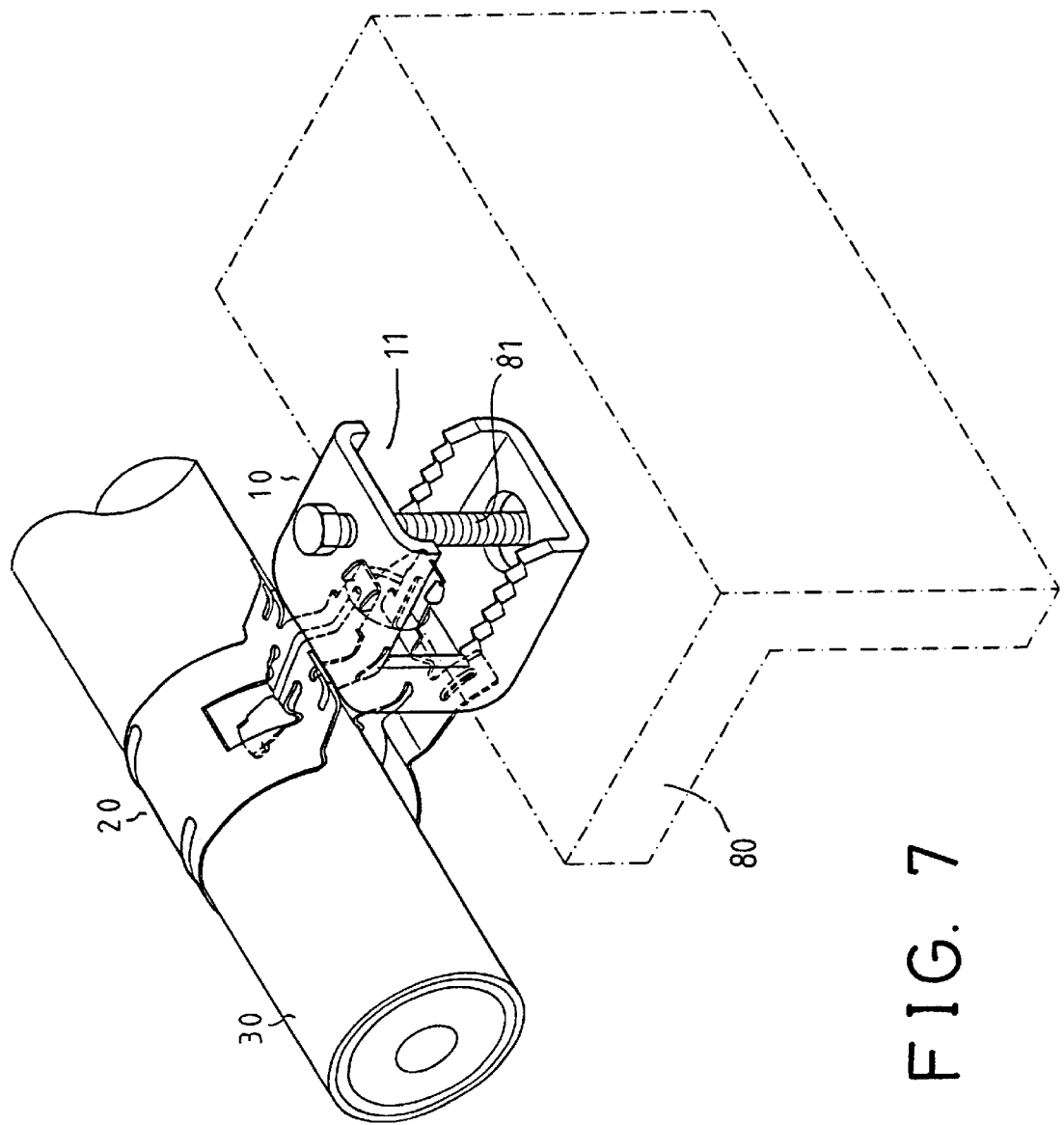

Referring to the drawings, and initially to FIGS. 1–6, a clasping device in accordance with the present invention comprises a bracket 10 including an opening 11 formed therein for receiving a supporting member 80 (FIG. 7) and including one or more holes, such as the screw holes 12 formed therein for receiving or threading with the fastener(s) 81 (FIG. 7) which may secure the bracket 10 to the supporting member 80. The bracket 10 includes one or more socket orifices 13 formed therein.

A clasping member 20 includes a curved body 21 having a chamber 26 formed therein for receiving an object 30, particularly one or more longitudinal objects 30 therein. The clasping member 20 includes two ends 23 each having a leg 231 extended therefrom for engaging into the socket orifice 13 of the bracket 10 and for enclosing the object 30 within the curved body 21. The legs 231 each includes a latch 24 provided thereon for engaging with the bracket 10 and for locking the clasping member 20 to the bracket 10. The ends 23 of the clasping member 20 each includes an outwardly extended hand grip 232 provided thereon and extended away from the leg 231 for moving the legs 231 toward each other and for disengaging the latches 24 from the bracket 10 when the legs 231 are forced toward each other by the hand grips 232. The clasping member 20 includes one or two cut off portions 22 formed therein and preferably formed close to one or both ends 23 of the clasping member 20 for defining one or two resilient blades 233.

As best shown in FIGS. 2–5, the blades 233 each includes a bent portion or a cusp 234 and a tip 235 extended inward of the curved body 21 for further resiliently clasping the object 30. The cusp 234 and the tip 235 of the blades 233 are arranged such that the tips 235 first engage with the object 30 (FIG. 3) before the cusps 234 are forced toward and to engage with and to clasp the object 30 (FIGS. 4, 5) by forcing the ends 23 or the hand grips 232 of the clasping member 20 toward each other.

Figure 8:
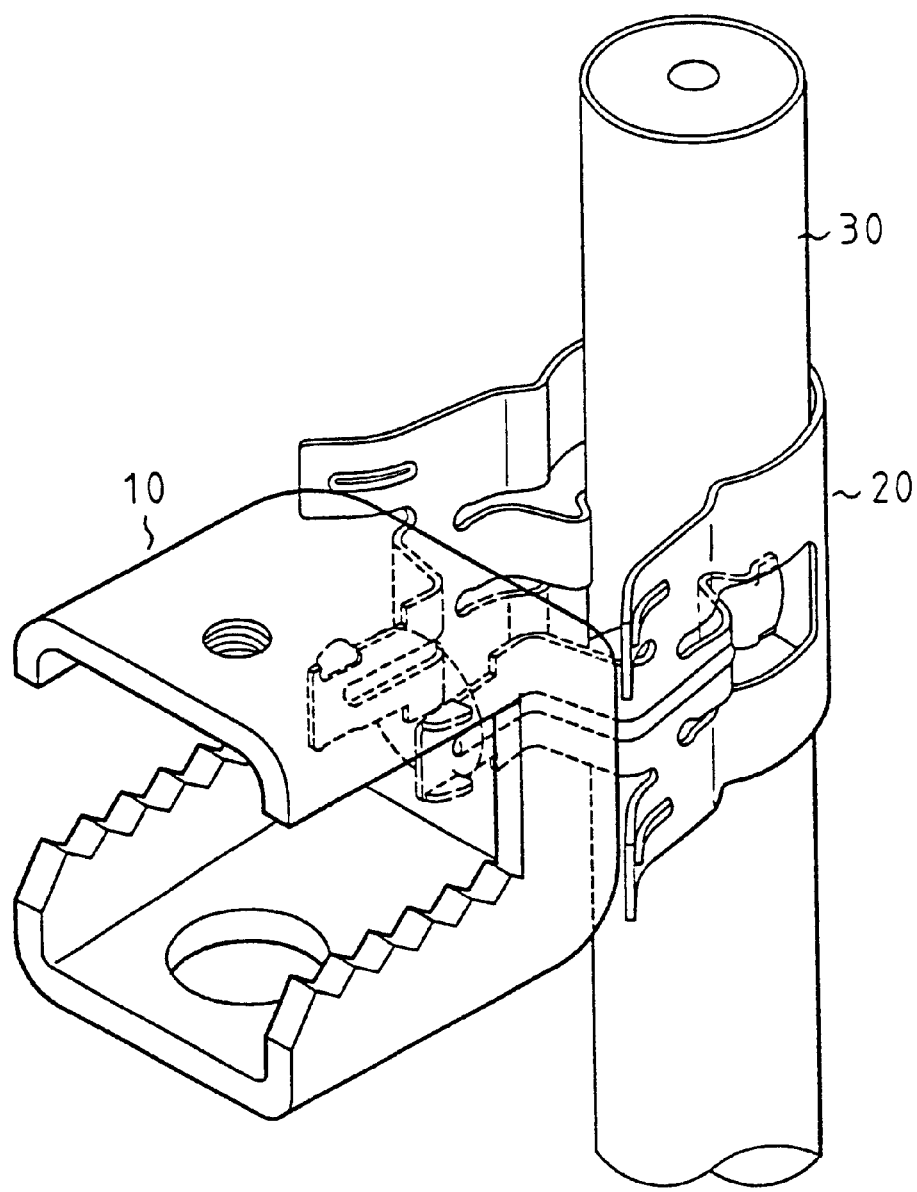
Figure 9:
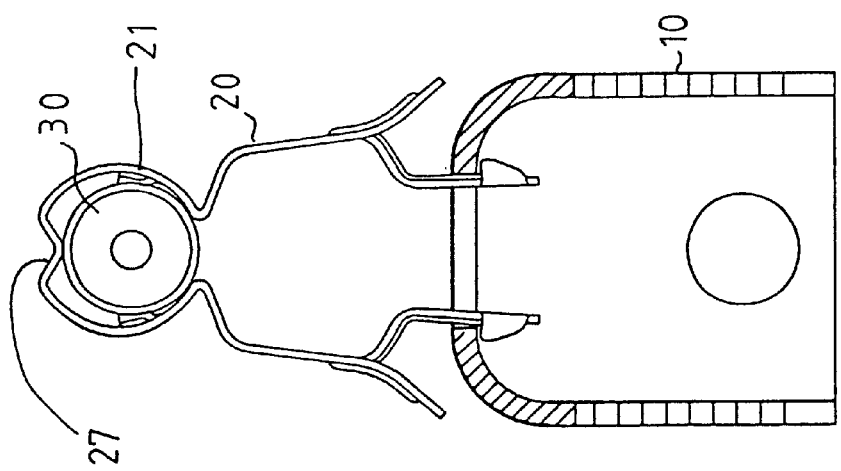
FIG. 9 is a schematic view illustrating the operation of the clasping device.

Referring next to FIG. 8, the blades 233 may also clasp the object 30 of smaller sizes which may not be engaged with or clasped by the curved body 21. As shown in FIG. 9, the curved body 21 of the clasping member 20 may further include a projection 27 extended inward therefrom for engaging with and for clasping an object 30 of much smaller size that may not be simply clasped in place by the blades 233 and the curved body 21.

Figure 10:
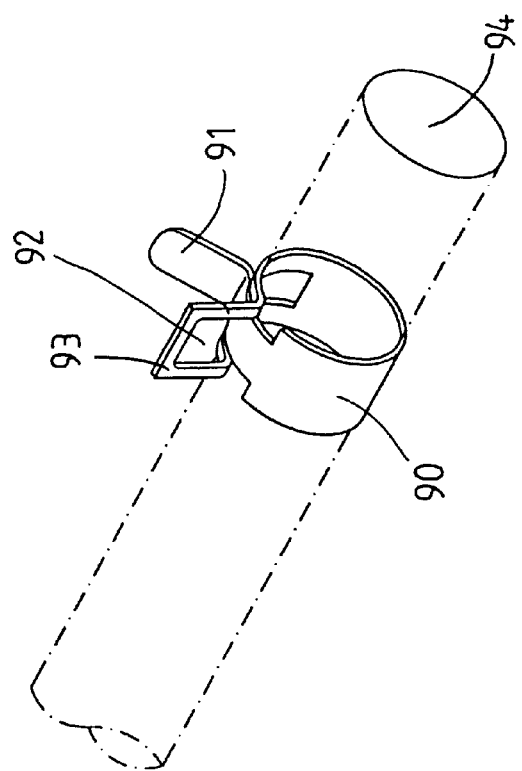
FIG. 10 is a perspective view illustrating the operation of the typical clasping device.

It is to be noted that the clasping device may include only one of the blades 233 that is extended inward of the curved body 21 and that may also be used to clasp the object 30 toward and within the curved body 21 of the clasping member 20 when the ends 23 of the clasping member 20 are forced toward each other. The blade(s) 233 may also be provided in the typical clasping device as shown in FIG. 10 for clasping the object in the curved body 90 of the typical clasping member by the legs 91, 93 in addition to the curved body of the clasping device.

Accordingly, the clasping device includes one or more inwardly extended resilient blades for suitably clasping one or more longitudinal objects.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A clasping device for clasping an object, said clasping device comprising:

a clasping member including a curved body having a chamber formed therein for receiving the object, said curved body including two ends and including at least one blade extended inward of said chamber of said curved body for engaging with and for clasping the object in said curved body, and means for forcing said ends of said curved body toward each other and to clasp the object in said curved body, said forcing means including a pair of hand grips extended outward from said ends of said curved body respectively for forcing said ends of said curved body toward each other and to clasp the object in said curved body, said forcing means further including a bracket having at least one socket orifice formed therein for receiving said ends of said curved body, said bracket including an opening formed therein for receiving a supporting member.

2. The clasping device according to claim 1, wherein said at least one blade includes a cusp extended inward of said chamber of said curved body for engaging with and for clasping the object in said curved body.

3. The clasping device according to claim 1, wherein said at least one blade includes a tip extended inward of said chamber of said curved body for engaging with and for clasping the object in said curved body.

4. The clasping device according to claim 1, wherein said ends of said curved body each includes a latch engaged with said bracket for securing said curved body to said bracket.

5. The clasping device according to claim 1, further comprising means for securing said bracket onto the supporting member.

* * * * *